United States Patent [19]

Galli et al.

[11] 3,818,343

[45] June 18, 1974

[54] ELECTRONIC DEVICE FOR SPEED SIGNALLING IN A D.C. MOTOR

[75] Inventors: Guido Galli, Bastiglia; Vito Tateo, Milan, both of Italy

[73] Assignee: Fabbrica Italiana Magneti Marelli, S.p.A., Milan, Italy

[22] Filed: Apr. 24, 1972

[21] Appl. No.: 246,840

[30] Foreign Application Priority Data

July 31, 1971 Italy................................. 26996/71

[52] U.S. Cl............... 324/177, 318/317, 246/182 B
[51] Int. Cl. .......................................... G01p 3/46
[58] Field of Search ........ 324/161, 162, 177; 317/5; 318/317; 246/182 B; 180/105 E

[56] References Cited
UNITED STATES PATENTS
2,649,572   8/1953   Carlson.............................. 324/177
3,052,117   9/1962   Miller ................................ 324/177

FOREIGN PATENTS OR APPLICATIONS
1,263,370   3/1968   Germany........................... 324/177

Primary Examiner—Michael J. Lynch
Attorney, Agent, or Firm—Ostrolenk, Faber, Gerb & Soffen

[57] ABSTRACT

Apparatus for developing an alternating signal whose amplitude is proportional to motor speed for monitoring motors and the like, said apparatus comprising means for converting a signal from the motor supply proportional to the supply voltage to a continuous signal; second means for converting a signal from the motor proportional to the current drawn by the motor to an alternating signal; applying the aforesaid signals to respective input terminals of a logarithmic amplifier for developing a composite signal having a constant component and an alternating component; and filtering said composite signal to pass only said alternating signal whose amplitude is proportional to motor r.p.m.

The resultant alternating signal may be converted to a d.c. or continuous signal by detector means for an output whose amplitude is proportional to motor r.p.m.

10 Claims, 1 Drawing Figure

3,818,343
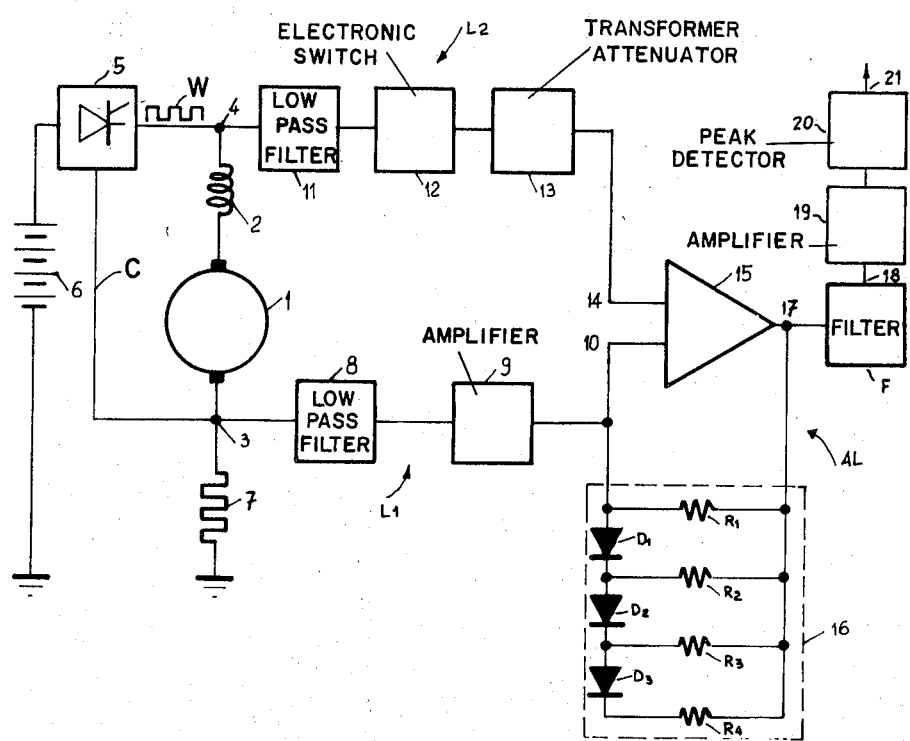

ELECTRONIC DEVICE FOR SPEED SIGNALLING IN A D.C. MOTOR

This invention relates to an electronic device for speed signalling in a D.C. motor.

The object of the present invention is to provide such a device which is completely free of mechanical members and readily applicable to motors without affecting the normal operation thereof.

A specific object of the invention is to provide an electronic speed device particularly suitable for traction motors supplied through an electronic switch.

According to the invention, these and other objects are accomplished by a device substantially comprising a logarithmic amplifier, to the input of which two voltage signals are applied, one of these two signals being a continuous signal proportional to the current drawn by the motor and the other being an alternating signal of high frequency and amplitude proportional to the motor supply voltage, but of a limited rate relative to that of said continuous signal; the amplifier output signal being applied to a high-pass filter supplying an alternating output signal, the amplitude of which is proportional to the motor r.p.m.

Therefore, the invention resides in using an analogue type of electronic circuit providing the division operation between two electric signals by taking advantage of the differential properties of a logarithmic amplifier.

From amplifier theory it is well known that on applying a bias signal to the input to a logarithmic amplifier, an output signal is provided as $Vu = K\log V_p$, wherein $V_p$ is the bias signal, and the differential gain of which is given by:

$$dVu/dV_p = K/V_p$$

Accordingly, when applying to the amplifier input also an alternating variable signal $Vi$, of a reduced amplitude with respect to that of the bias signal and of high frequency relative to the changes in the latter, this signal will be still present at the output, as amplified by $K/V_p$, so that the resulting signal will be:

$$V = K\log V_p + (K/V_p) Vi,$$

wherein the first term $K\log V_p$ is the continuous component (rest signal) and the second term $(K/V_p) Vi$ is the variable component separable by a filter.

Where, according to the invention, a continuous signal proportional to the current drawn by the motor is used as bias signal and an alternating signal of an amplitude proportional to the supply voltage is used as variable signal, it will be apparent from the foregoing that a signal proportional to the quotient of the two terms will be provided at the output, so that on eliminating the continuous component, an alternating signal of an amplitude proportional to $n$ (motor r.p.m.) is obtained.

Should the current and voltage signals from the motor be not continuous, but of the square wave type and the like, the conversion thereof to continuous signals would be required in order to render the same respectively suitable for amplifier bias and successive conversions to alternating signal of a given frequency and amplitude proportional to the mean value of the motor supply voltage.

To this end, the device according to the invention comprises filters to obtain the median value for the signals withdrawn by the motor. In any case, the device comprises an electronic switch for converting (sampling) the continuous signal proportional to the supply voltage or the median value thereof to an alternating signal, and other means for removing the continuous component from the alternating signal as provided by the switch and attenuating the amplitude of the signal prior to being applied to the amplifier.

The invention will now be described with reference to the accompanying drawing showing by mere way of example the electric block diagram for the electronic speed signalling device as applied to a D.C. series motor and supplied through a Jones chopper type of electronic switch.

In the diagram, reference numeral 1 designates the D.C. electric motor energized by series winding 2, while 3 and 4 are the two supply terminals and 5 the Jones chopper type of electronic switch through which battery 6 supplies the motor.

This electronic switch 5 is well known to those skilled in the art, and therefore its detailed description will be omitted. It should only be noted that due to the provision of this switch, the supply signal at the motor terminal 4 will be of the square wave type, as diagrammatically shown by waveform W.

According to the invention, the electronic speed signalling device comprises a low rate resistor 7 series connected to the motor and grounding said terminal 3, a first electric circuit $L_1$ capable of withdrawing at terminal 3 a voltage signal proportional to the current drawn by the motor and converting it to a continuous signal proportional to the median value of said current, a second circuit $L_2$ capable of withdrawing at terminal 4 a signal proportional to the motor supply voltage and converting it to an alternating signal having predetermined characteristics, a logarithmic amplifier AL, to the input of which said continuous and alternating signals are applied, and finally a high-pass filter F located at the output of said amplifier AL.

Circuit $L_1$ substantially comprises a low-pass filter 8 and amplifier 9. This filter provides the mean value for the signal being withdrawn at 3, so as to render the same continuous and usable as an amplifier bias signal applied to the first input 10.

Circuit $L_2$ also comprises a low-pass filter 11 to provide the mean value for supply voltage, an electronic switch 12, and a transformer-attenuator 13 applying the signal to the second amplifier input 14. Said switch 12 converts (samples) the continuous signal proportional to the median value for supply voltage to an alternating signal of a given frequency, and the next apparatus 13 removes the continuous (i.e. d.c.) component from said alternating signal and reduces the amplitude thereof. As a result, the signal applied to terminal 14 is an alternating signal of high frequency, whose amplitude is proportional to supply voltage, but of a negligible value as compared with that for the bias signal applied to the first input 10.

The provision of filters 8 and 11 is interrelated to the type of supply being used for the motor; as apparent, such filters would be omitted where the supply signal at 3 and 4 is continuous. Switch 12 and apparatus 13 are, however always present; such elements are of a conventional type and could form a single apparatus capable of providing an alternating signal at the output, the median value of which is zero and of a given amplitude.

The logarithmic amplifier AL comprises the operational amplifier 15 and feedback circuit 16 with resistors $R_1$, $R_2$, $R_3$, $R_4$ and diodes $D_1$, $D_2$, $D_3$.

The logarithmic amplifier is also conventional and the description thereof is herein omitted.

In operation, a signal proportional to the current drawn by the motor and withdrawn at 3, given by $K_1 I$, and a signal proportional to the motor supply voltage at 4, given by $$V = E + RI = K_2 N I \pm RI$$

are respectively applied, following the above mentioned conversions, to the amplifier inputs 10 and 14, whose output provides a signal corresponding to $$K_2 n I + RI/K_1 I \text{ or}$$

Upon removal by means of filter $F$, of the continuous component of said signal, a variable signal is provided at 18, this variable signal being given by $K_3 n$ and having an amplitude proportional to the motor speed.

When it is desired to have a D.C. output voltage linearly varying with $n$ (motor r.p.m.), said signal is then amplified at 19 and detected by means of a peak detector 20. Thus, a D.C. or continuous signal is available at output 21, similar to the signal which can be conventionally withdrawn from a tachometer dynamo.

In the type of supply herein shown, resistor 7 is just provided for supplying a current signal to electronic switch 5 through line C. Thus, it will be appreciated that in the exemplar circuit, normally used in traction motors, the application of the electronic device according to the invention would not require any tampering with the motor, its mere connection to terminals 3 and 4 being sufficient.

The device herein shown can be modified in accordance with particular requirements, type of motor and so on, without departing for this from the scope of the invention.

What is claimed is:

1. An electronic device for continuously monitoring and determining the speed of a d.c. motor comprising:

an alternating signal source of a first frequency coupled across the motor for supplying driving energy to the motor;

first means for converting the output of said signal source into a signal (A) of a higher frequency and reduced amplitude relative to the output of said alternating signal source, said reduced amplitude being proportional to the amplitude of the output of said alternating signal source;

second means coupled to said motor for converting the magnitude of current drawn by said motor into a d.c. signal (B) whose level is proportional to the magnitude of current drawn by said motor;

third means having first and second inputs for receiving and generating the logarithmic value A/B derived from the outputs of said first and second means;

means for filtering the output of said third means and for removing the d.c. component from the output of said third means to generate a signal whose amplitude is proportional to motor speed.

2. The device of claim 1 wherein said third means comprises an electronic switch coupled to said alternating signal source and a transformer attenuator coupled between said electronic switch and one input of said third means.

3. The device of claim 1 wherein said second means comprises low-pass filter means coupled to said motor and amplifier means coupled between said low-pass filter and the second input of said third means.

4. The device of claim 1 wherein said d.c. motor is a series wound d.c. motor.

5. The device of claim 1 wherein said alternating signal source comprises a d.c. source and a Jones chopper coupled between said d.c. source and said motor.

6. A method for measuring the rotational speed of a d.c. motor driven by a pulse generating source wherein use is made of two voltage signals, one of which is proportional to the current drained by the motor and the other of which is proportional to the motor supply voltage wherein measurement of the rotational speed of the d.c. motor comprises the steps of:

converting the signal proportional to the current drawn by the motor to a d.c. bias signal (B) proportional to the average value of the current drawn by the motor;

converting the output of the pulsating signal source into an alternating signal (A) having a constant frequency greater than the frequency of the pulsating signal source and having an amplitude proportional to its average value but smaller than the mangitude of said d.c. bias signal;

logarithmically combining said d.c. bias signal B and said alternating signal A to develop a signal A/B; and removing the d.c. component from the developed signal to provide an alternating signal having an amplitude proportional to the rotational speed of the motor.

7. The method of claim 6 further comprising the step of amplifying the alternating signal having an amplitude proportional to the rotational speed of the motor and detecting the peak amplitude of said signal.

8. The method of claim 6 wherein the step of converting the output of the pulsating signal source into a d.c. bias signal further comprises the steps of converting the output of the pulsating signal source into a d.c. signal proportional to its average value;

converting the d.c. signal to a signal having a constant frequency which is higher than the frequency of the signal generated by the pulsating signal source and having an amplitude proportional to the average value of the signal generated by the pulsating signal source;

removing the average value of said high frequency signal and reducing the amplitude.

9. The method of claim 6 wherein the step of generating a d.c. bias signal further comprises the steps of smoothing the current signal drawn by said motor and amplifying the smoothed current signal.

10. The method of claim 6 wherein the step of converting the output of the pulsating signal source further comprises the steps of smoothing said signal source to generate a d.c. signal proportional to the average value of the pulsating signal;

converting the d.c. signal to a signal having a constant frequency greater than the frequency of the signal generated by the pulsating signal source and an amplitude proportional to the average value thereof; and reducing the amplitude of the higher frequency signal.

* * * * *